Dec. 28, 1948.   B. N. McCAIN   2,457,581
TRAILER
Filed Oct. 8, 1947
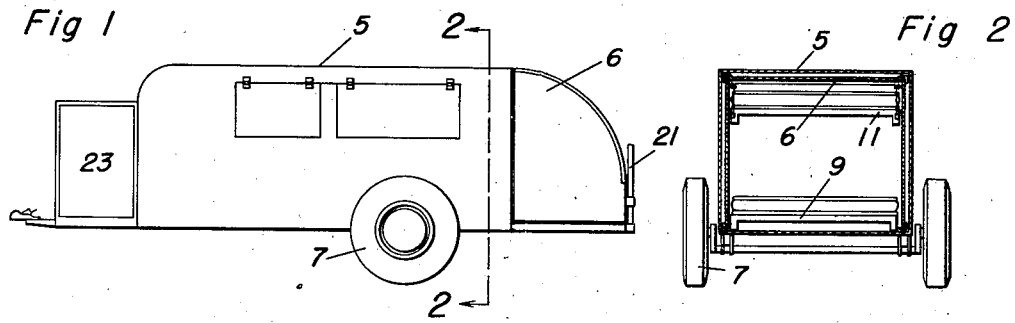
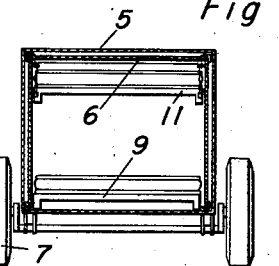
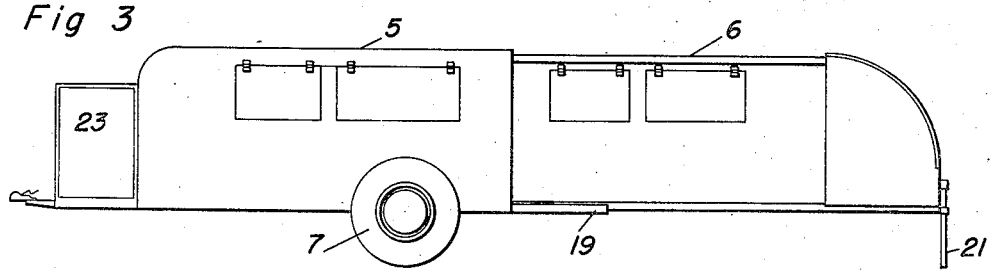
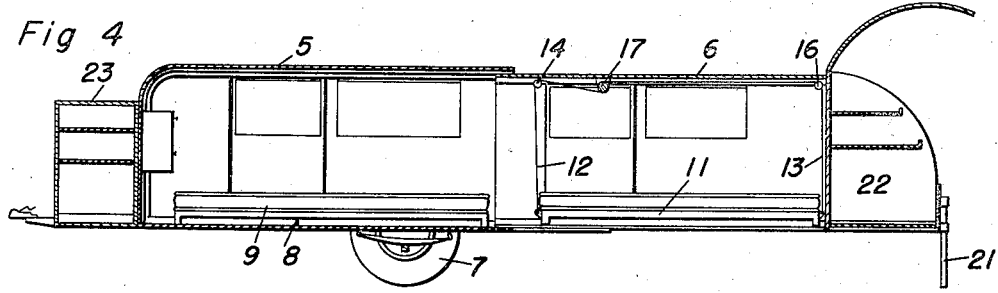
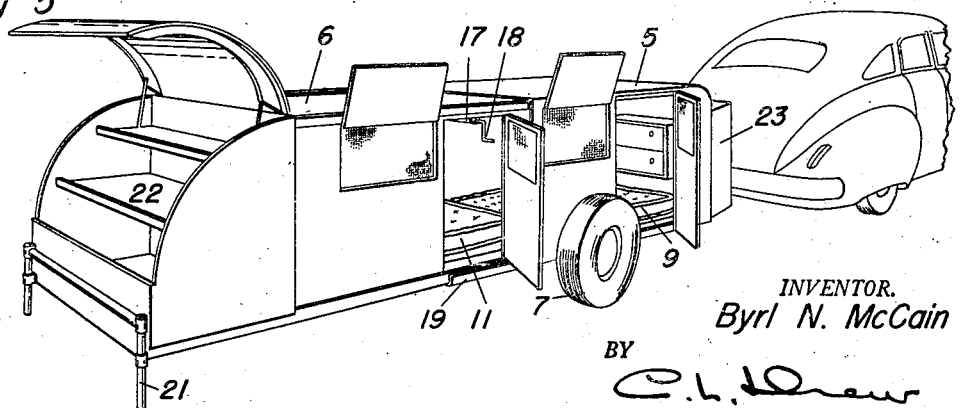
INVENTOR.
Byrl N. McCain
BY
Att'y Patented Dec. 28, 1948

2,457,581

UNITED STATES PATENT OFFICE 2,457,581

TRAILER

Byrl N. McCain, San Jose, Calif.

Application October 8, 1947, Serial No. 778,592

1 Claim. (Cl. 296—23)

This invention relates to improvements in trailers and has particular reference to a telescopic trailer.

The principal object of this invention is to provide a trailer in which a pair of full size beds may be positioned in horizontal alignment one with the other, and in end to end relation during use.

A further object is to provide means whereby one of the beds may be elevated above the other and so positioned during transportation.

A still further object is to produce a device of this character which is relatively low to the ground thereby permitting full rear vision from the driving vehicle.

Another object of this invention is to produce a device of this character which is neat in appearance, one which is easy to manipulate and one which occupies a minimum amount of space when stored.

Other objects and advantages will be apparent during the course of the following description.

In the accompanying drawings forming a part of this specification and in which like numerals are employed to designate like parts throughout the same, Fig. 1 is a side elevation of my trailer in closed position.

Fig. 2 is a cross sectional view taken on the line 2—2 of Fig. 1.

Fig. 3 is a view similar to Fig. 1 showing the parts in extended position.

Fig. 4 is a vertical cross sectional view of the parts shown in Fig. 2, and

Fig. 5 is a perspective view of my trailer in extended position.

An ordinary small trailer does not provide ample sleeping accommodations due to limited space and even in larger trailers sleeping accommodations are inadequate. I have, therefore, devised a trailer wherein adequate and comfortable sleeping accommodations are provided for two or more persons.

I have also provided a structure which when extended provides adequate sleeping accommodations but is also low enough so that visibility from the driving vehicle will be clear at all times over the top of the trailer. This is a very important safety factor and assists materially in the backing and parking operation.

In the accompanying drawings wherein for the purpose of illustration is shown a preferred embodiment of my invention it will be noted that my trailer consists of a section 5 and a section 6, the section 5 being a substantially rectangular arrangement mounted upon ground engaging wheels 7. The section 5 has a floor 8, upon which springs and a mattress are positioned, as shown at 9. The springs and the mattress are spaced from the sides of the section, as shown in Fig. 2, thus permitting the sides of the section 6 to slide thereby during the telescoping operation.

In the section 6 I suspend springs and a mattress, as shown at 11, through the medium of cables 12 and 13 which pass upwardly over pulleys 14 and 16 respectively and are in turn connected to a rod 17, which when rotated by a removable crank 18 permits the bed 11 and its supporting springs to be raised and lowered, the purpose of which will be later seen.

The forward part of the section 6 is supported, when extended, by rearwardly extending angle members 19 while the rear end of this section is supported by removable supports 21 which are in the position shown in Fig. 1 during travel and are placed in the position shown in Figs. 3 and 4 when the extension is moved to its outer position.

A trunk 22 may serve as a cooking compartment, and a forward cabinet 23 may serve as an ice box or other storage space.

In use when the parts are as shown in Fig. 1, a locking pin not shown is removed, after which the section 6 may be withdrawn to the position of Fig. 2, and the supports 21 moved from the position of Fig. 1 to that of Fig. 2.

By now actuating the crank 18 the mattress and springs 11 may be lowered so that they are in end to end relation with the bed 9, thus permitting two full size beds to be ready for use.

When it is desired to telescope the parts the crank 18 is again operated to raise the bed 11 to the position of Fig. 2, after which the parts 5 and 6 may be telescoped and the same are then ready for movement to any desired location.

It will thus be seen that I have produced a device which will perform all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a trailer, a pair of telescoping sections, one slidable within the other in a longitudinal direction, extensions formed on the outer of said sections for supporting said inner section when extended, reversible supports carried by said inner section for supporting the free end of said inner section when extended, a bed positioned in said outer section and having its sides spaced from the sides of said outer section, a second bed positioned in said inner section, said second-mentioned bed being suspended by cables, and a crank operatively connected to said cables whereby said second-mentioned bed may be elevated above the plane of said first-mentioned bed when said telescopic sections are in telescoped position.

BYRL N. McCAIN.

REFERENCES CITED

The following references are of record in the file of this patent:

UNITED STATES PATENTS

| Number | Name | Date |
|---|---|---|
| 467,423 | Merritt | Jan. 19, 1892 |

FOREIGN PATENTS

| Number | Country | Date |
|---|---|---|
| 447,229 | Germany | July 19, 1927 |